United States Patent
Oudar et al.

(10) Patent No.: US 10,162,246 B2
(45) Date of Patent: Dec. 25, 2018

(54) METHOD FOR MANUFACTURING MIRRORS WITH SEMICONDUCTOR SATURABLE ABSORBER

(71) Applicant: Centre National de la Recherche Scientifique—CNRS, Paris (FR)

(72) Inventors: Jean-Louis Oudar, Chatenay Malabry (FR); Sophie Bouchoule, Villejuif (FR)

(73) Assignee: Centre National De La Recherche Scientifique—CNRS, Paris (FR)

( * ) Notice: Subject to any disclaimer, the term of this patent is extended or adjusted under 35 U.S.C. 154(b) by 14 days.

(21) Appl. No.: 15/112,567

(22) PCT Filed: Jan. 19, 2015

(86) PCT No.: PCT/EP2015/050872
§ 371 (c)(1),
(2) Date: Jul. 19, 2016

(87) PCT Pub. No.: WO2015/107186
PCT Pub. Date: Jul. 23, 2015

(65) Prior Publication Data
US 2016/0342067 A1    Nov. 24, 2016

(30) Foreign Application Priority Data
Jan. 20, 2014 (FR) .................... 14 50430

(51) Int. Cl.
*G02F 1/355* (2006.01)
*G02F 1/35* (2006.01)
(Continued)

(52) U.S. Cl.
CPC .......... *G02F 1/3556* (2013.01); *G02F 1/3523* (2013.01); *H01S 3/0405* (2013.01);
(Continued)

(58) Field of Classification Search
CPC ....... G02F 1/3556; G02F 1/355; H01S 3/0405
(Continued)

(56) References Cited

U.S. PATENT DOCUMENTS 2,750,332 A * 6/1956 Miller ................. C25D 5/08
204/224 R
5,434,873 A * 7/1995 Delfyett, Jr. ........... B82Y 20/00
372/11
(Continued)

FOREIGN PATENT DOCUMENTS

WO    WO 2006122727 A1 * 11/2006 ............. B82Y 20/00

OTHER PUBLICATIONS

International Search Report issued in PCT/EP2015/050872 dated May 8, 2015 (3 pages).
(Continued)

*Primary Examiner* — Jami V Miller
(74) *Attorney, Agent, or Firm* — Osha Liang LLP

(57) ABSTRACT

The invention relates to a method for manufacturing mirrors with saturable semiconducting absorptive material, which includes: depositing a saturable semiconducting absorptive material (205) onto a growth substrate (200) in order to form a structure; depositing at least one metal layer onto the structure such as to form a first mirror (211); and depositing a heat-conductive substrate (212) onto the metal layer by electrodeposition through an electrically insulating mask (312), allowing the selective deposition of the thermally conductive substrate, in order to predefine the perimeter of the mirrors with saturable semiconducting absorptive material.

8 Claims, 7 Drawing Sheets

(51) Int. Cl.
  *H01S 3/11* (2006.01)
  *H01S 3/04* (2006.01)
  *H01S 3/113* (2006.01)
(52) U.S. Cl.
  CPC ...... *H01S 3/1118* (2013.01); *G02F 2202/101* (2013.01); *G02F 2202/102* (2013.01); *H01S 3/113* (2013.01)
(58) Field of Classification Search
  USPC .......................................................... 438/57
  See application file for complete search history.

(56) References Cited

U.S. PATENT DOCUMENTS

| | | | | |
|---|---|---|---|---|
| 6,560,268 B1* | 5/2003 | Deichsel | ............... | B82Y 20/00 |
| | | | | 372/11 |
| 9,222,703 B2* | 12/2015 | Dasbach | ............... | B23K 26/18 |
| 2009/0120997 A1* | 5/2009 | Oudar | .................. | G02F 1/3523 |
| | | | | 228/176 |

OTHER PUBLICATIONS

Written Opinion of the International Searching Authority issued in PCT/EP2015/050872 dated May 8, 2015 (7 pages).
Steinmetz, A. et al.; "Nonlinear compression of Q-Switched laser pulses to the realm of ultrashort durations"; Optics Express, vol. 19, No. 4, Feb. 14, 2011, pp. 3758-3764 (7 pages).

* cited by examiner

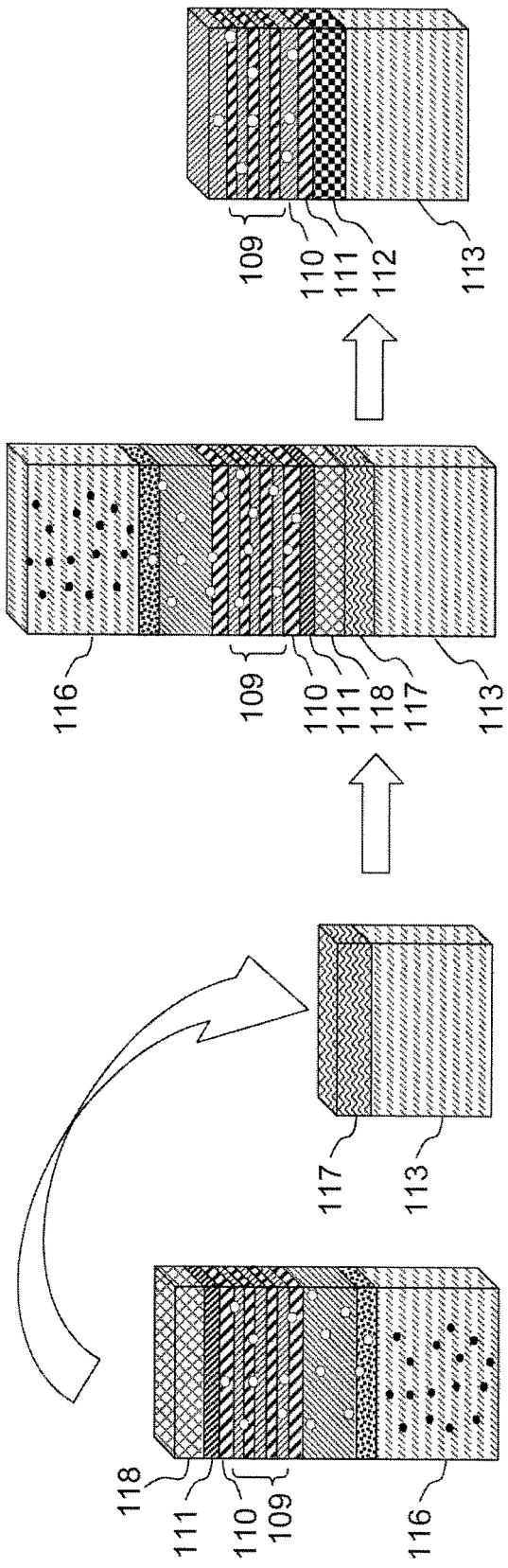

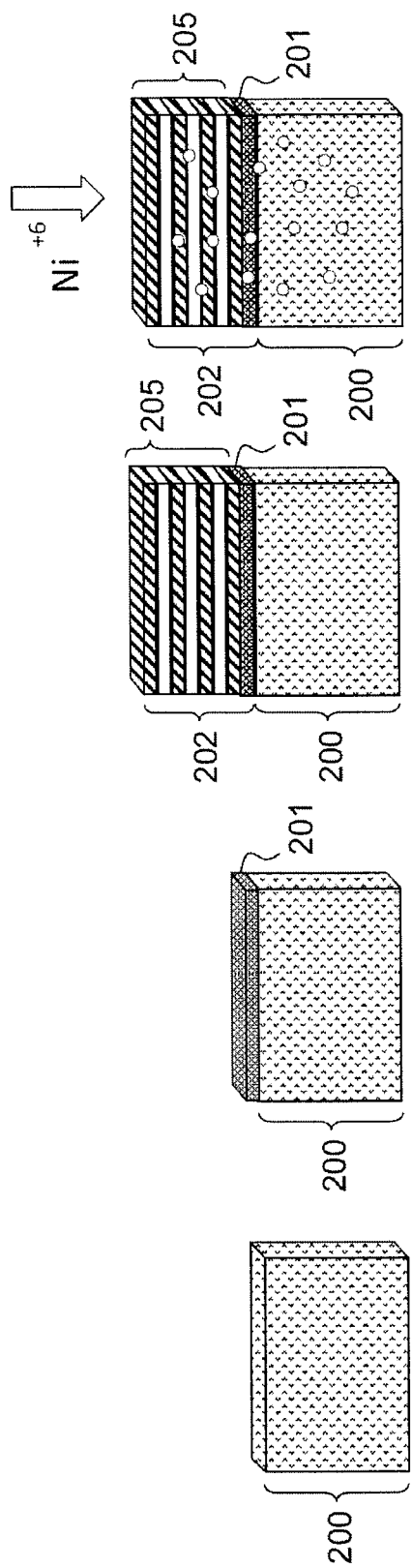
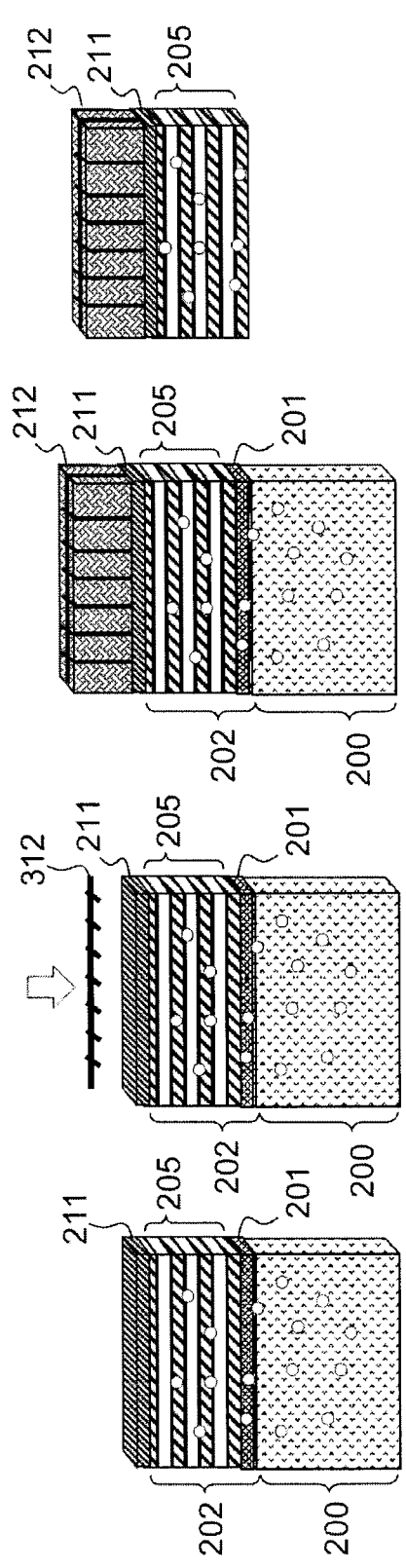

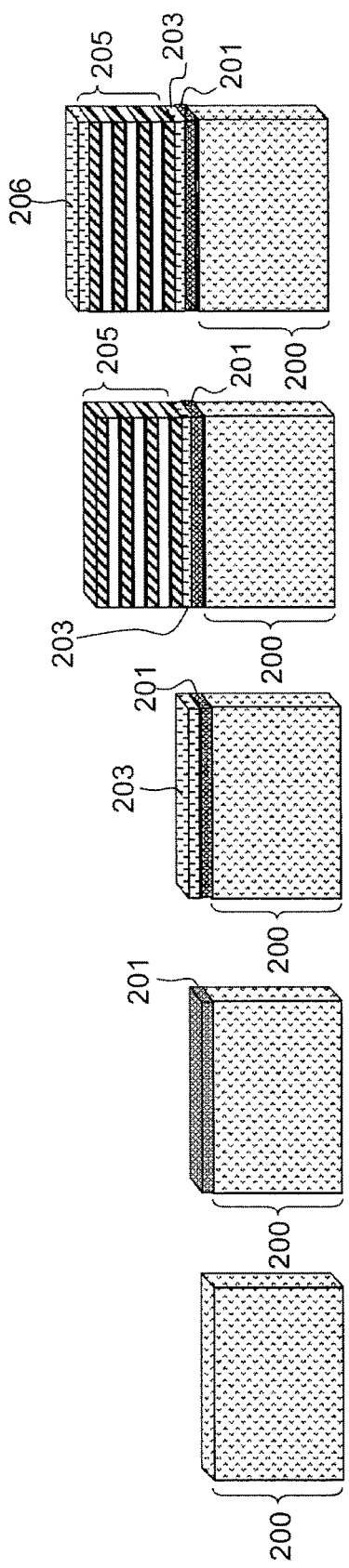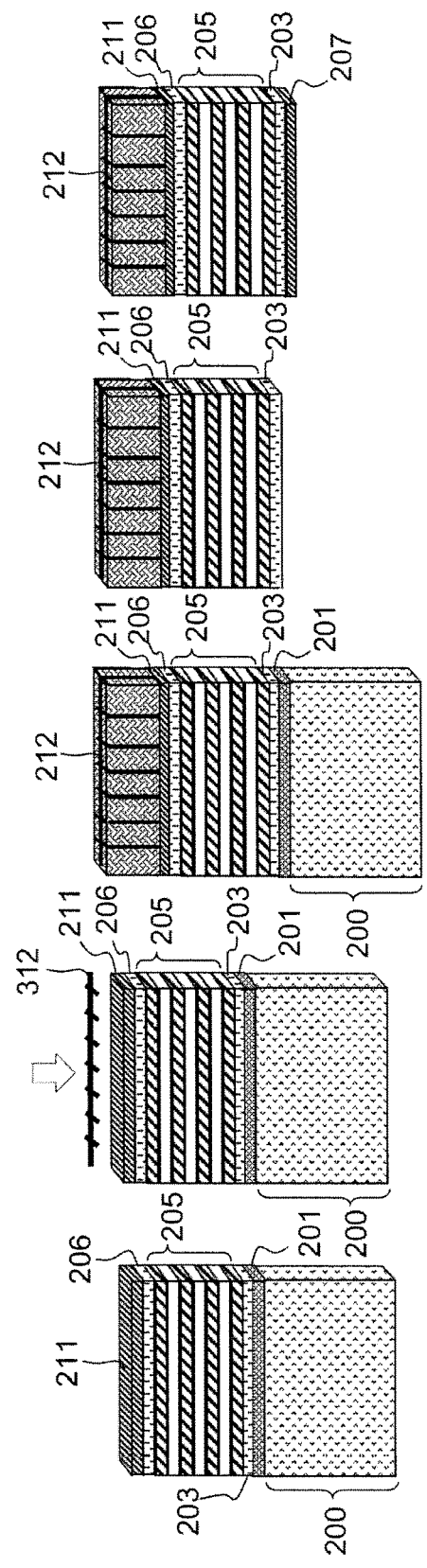

METHOD FOR MANUFACTURING MIRRORS WITH SEMICONDUCTOR SATURABLE ABSORBER

PRIOR ART

Technical Field of the Invention

The present invention relates to a method for manufacturing mirrors with semiconductor saturable absorber and mirrors obtained by the said method.

Prior Art

In the last few years, the generation of short-pulse optical sources (100 fs to 1 ps) has become an increasingly important technology in many applications, for example laser micro-machining, the formation of thin films or again laser cleaning.

Mirrors with semiconductor saturable absorber (or SESAM for SEmiconductor Saturable Absorber Mirror) are one of the key elements of this technology, since they allow the time-domain conditioning of the pulses and the characteristics of the laser emission, including notably the pulse duration, the emitted power and the stability.

The operation of a SESAM is based on the phenomenon of saturation of the absorption of semiconductor materials. The variation of the coefficient of absorption $\alpha$ of a saturable absorptive material depends on the intensity I of the incident light signal passing through it. FIG. 1A illustrates the coefficient of absorption of a saturable absorptive material as a function of the intensity I of the incident light signal. Light signals of low intensity are subjected to the intrinsic absorption of the material and are consequently absorbed. In contrast, light signals of high intensity render the semiconductor material transparent reducing its absorption to a value of substantially zero and are transmitted without being absorbed. This is the phenomenon of saturation of the absorption. The majority of materials show saturable absorption, but often at very high light intensities, close the optical damage level. Semiconductor materials exhibit particular energetic structures which allow phenomena of saturation of the absorption at lower thresholds of light intensity. More precisely, the carriers of the valence band (electrons) go into a higher energy state (the conduction band) under the effect of a sufficiently high incident light intensity, with a shorter time than the relaxation time of the carriers to the fundamental state. This leads to the filling of the higher energy state to the detriment of the fundamental level and a saturation of the absorption. The parameters which characterize a semiconductor saturable absorber are notably the range of absorption wavelength, the light intensity threshold for observing a saturation of the absorption and the dynamic response, in other words the speed at which it recovers its unsaturated level of absorption when it is no longer illuminated. The latter parameter is directly linked to the lifetime of the carriers in the excited state.

Inserted into a laser cavity, the SESAMs are used for generating a pulsed laser emission, in passive mode locking (mode blocking) regime. One example of a laser device into which a mirror with semiconductor saturable absorber (SESAM) is inserted is shown in FIG. 2A. In this example, the laser device comprises a doped fiber 1 as gain medium. The fiber is optically pumped by a diode 2. The beam produced by the diode is injected into the doped fiber 1 by means of a multiplexer 6. The cavity of the laser device is a Fabry-Pérot cavity composed of a total reflection mirror 3, of a SESAM 4 and of a coupler 5 for sampling the output light signal before and after the passage through the SESAM. The graph in FIG. 2B illustrates the principle of operation of a laser device such as shown in FIG. 2A. This figure shows a function of the time the laser losses (curve 9—long dashed line), mainly the losses coming from the cavity of the laser, the gain of the laser device (curve 7—short dashed lines) and the laser emission (curve 8—solid line). At t=0, the optical pumping of the gain medium begins, the losses are high and are kept high by the SESAM which has an absorbing behavior at low incident intensity. During this pumping time, the value of the gain increases until it approaches the value of the losses. Until this point, the laser emission is still blocked by the SESAM which artificially amplifies the losses of the cavity. Then, the increase in the gain leads to the increase in the light intensity in the cavity, which causes the whitening of the saturable absorptive material at the wavelength of the laser emission. Thus, the losses decrease. As soon as the gain becomes higher than the losses, a laser pulse is born, leading to a rapid drop in the gain. Very short pulses (duration ~ps, fs) are thus obtained.

In order for the SESAMs to be efficient in this context, in other words for them to be able to interact with significant laser powers (typically of the order of 1 mW to several W), it is necessary for them to fulfill several conditions, including notably a high coefficient of absorption, a short lifetime of the excited carriers of the saturable absorptive material (typically of the order of a picosecond) and a good thermal dissipation.

Several methods for fabricating SESAMs have been developed. In particular, there exist two approaches for the growth of SESAMs: the growth referred to as "lattice mismatched" and the growth referred to as "lattice matched". In the growth referred to as "lattice mismatched", the lattice parameter of the substrate is different to the lattice parameter of the layer to be epitaxied, which leaves greater choice in the materials to be epitaxied. The atoms are deposited in a first stage according to the crystal structure of the substrate. The material deposited is therefore constrained by the substrate. However, when the thickness of the epitaxied layer increases, the atoms are deposited according to the structure of the unstressed material, and the accommodation of the lattice parameter leads to the creation of dislocations. This has the advantage of naturally introducing defects into the epitaxied layers, which will allow the lifetime of the excited carriers to decrease. Nevertheless, the devices obtained with this method are not very robust because of the dislocations. On the other hand, the growth referred to as "lattice matched" allows a continuity of the interatomic bonds to be obtained at the interface between the substrate and the layer to be epitaxied. The devices thus fabricated have an excellent crystalline quality and are more robust; however, this method is dependent on the type of substrate used, limiting the choice of materials and hence the choice of the range of wavelength of use. In particular, for wavelengths greater than 1.1 µm, it is necessary to use a substrate of InP (Indium Phosphide). However, semiconductor compounds comprising InP have a poor thermal behavior, and evacuate heat with difficulty; this limits the performance of the use of the SESAMs in laser devices. One effective solution to this technical problem is the use of a thermal dissipator.

One technique for fabrication of a component using semiconductor saturable absorber on an InP substrate with the insertion of a thermal dissipator is described in the patent FR2835065. FIGS. 3A to 3D illustrate this method of fabrication. This technique comprises the formation of a first structure (FIG. 3A) comprising a stack of layers on a substrate 115, for example made of InP, the stack of layers notably comprising a saturable absorptive material 109, a metal layer 111 for the formation of a mirror and a first metal layer 116 intended for the formation of a solder joint. The technique described comprises further the formation of a second structure (FIG. 3B), obtained by deposition of a second metal layer 117 intended for the formation of the solder joint on a thermally-conductive substrate 113. The first 116 and second 117 metal layers are subsequently brought into contact and assembled forming a solder joint 112 by solid-liquid inter-diffusion (FIG. 3C). The fabrication of the component ends with the removal of the InP substrate 115 (FIG. 3D). The thermally-conductive substrate 113 then has the role of thermal dissipator within the component thus formed.

This technique allows fabrication of components with semiconductor saturable absorber that has a better thermal behavior than the components using semiconductor saturable absorber based on InP. Nevertheless, this technique lends itself poorly to the collective fabrication of a large number of components. Indeed, the technique for transferring the first structure onto the second structure, such as described in the preceding paragraph, is achievable over a maximum area of 1 cm$^2$, unless the solder joint is formed in a press with a large surface area that would be necessary to specially develop for this purpose. This results in high costs associated with the price of the epitaxy, or with the price of the development of a press compatible with soldering over a large surface are. Moreover, in the latter case, sawing up the individual components has to be provided, once the removal of the substrate has been carried out.

The present invention provides a method for manufacturing mirrors with semiconductor saturable absorber notably allowing the fabrication of mirrors with semiconductor saturable absorber in large quantities with excellent quality.

SUMMARY OF THE INVENTION

According to a first aspect, the invention relates to a method for manufacturing mirrors with semiconductor saturable absorber (SESAM) comprising: the deposition onto a substrate for growth of a semiconductor saturable absorptive material so as to form a structure; the deposition of at least one metal layer onto the structure in order to form a first mirror; the deposition by electro-deposition through an electrically-insulating mask of a thermally-conductive substrate onto the metal layer, allowing a selective deposition of the thermally-conductive substrate which predefines the perimeter of the SESAMs.

It is thus possible, on the one hand, to deposit a dense and uniform metal layer with a control of the final thickness of the SESAM and, on the other hand, to fabricate in a collective manner at a low cost a large number of SESAM mirrors with semiconductor saturable absorber with identical characteristics starting from a single epitaxied wafer.

According to a variant, the method comprises a step for the introduction of crystal defects into the semiconductor saturable absorptive material with the aim of adjusting the lifetime of the carriers in the lower semiconductor saturable absorptive material. The presence of crystal defects within the saturable absorptive material advantageously allows the process of relaxation of the absorption to be accelerated without degradation of the properties of the latter, the defects playing the role of efficient capture centers for electron-hole pairs.

According to a variant, the introduction of crystal defects comprises a step for ion irradiation in the saturable absorptive material. With the method of ion irradiation, it is possible to cause the introduction of crystal defects at any given moment in the fabrication between two growth steps and to adjust the depth of the irradiated layers.

According to a variant, the first mirror is used as a cathode for the electro-deposition. Thus, the deposition takes place directly on the device without any intermediate step or layer.

According to a variant, the electrically-insulating mask has structure-forming patterns comprising insulating regions and open areas, defining the perimeter of the mirrors with semiconductor saturable absorber. The insulating structures determining the patterns to be structured and the open areas notably allow the formation of preferable pathways for the dicing of the individual SESAMs and a relaxation of the possible constraints of the electrodeposited metal layer.

According to a variant, the method of fabrication comprises further a step for deposition of a second mirror on the saturable absorptive material for the formation of a Fabry-Pérot microcavity.

According to a variant, the formation of the structure comprises a step for deposition of a first phase layer between the first mirror and the saturable absorptive material and a step for deposition of a second phase layer between the second mirror and the saturable absorptive material. Notably, by adjusting the thicknesses of the phase layers, it is possible to suitably position the active layer at the maximum intensity of the intra-cavity wave.

According to a variant of the invention, the method comprises further a step for separating the mirrors in order to obtain a large number of SESAMs starting from a single epitaxied wafer.

According to a second aspect of the invention, the invention relates to a mirror with semiconductor saturable absorber obtained by a method such as described according to the first aspect and its variants and comprising: a semiconductor saturable absorptive material, a first mirror disposed on the saturable absorptive material comprising a metal layer and a thermally-conductive substrate formed by electrolytic deposition on the mirror. Advantageously, the first mirror is made of Au or of Cu in order to obtain a high reflectivity and a high thermal conductivity.

According to a variant, the carriers of the material have a lifetime less than 100 ps in the excited state allowing the response time of the SESAM to be reduced. This short lifetime of the carriers allows the response time of the mirror with semiconductor saturable absorber to be optimized, in other words to be reduced, and hence the dynamic response of the SESAM (key parameters of the SESAM such as described in the prior art) to be increased.

According to a variant, the saturable absorptive material comprises a stack of semiconductor layers forming quantum wells and barriers. The dimensions of the thicknesses of the quantum wells and of the barriers which separate the quantum wells allow an excitonic absorption to be obtained that is more particularly marked at the wavelength of use. Advantageously, the saturable absorptive material comprises a stack of layers of InGaAs forming quantum wells and of layers of InP forming barriers for an operation of the SESAM around 1.5 µm, or other compositions of quantum wells (for example InGaAsN for the wells and InGaAs or InP for the barriers) allowing wavelengths of operation to be reached going up to 2 µm or 2.5 µm.

According to a variant of the invention, the thermally-conductive substrate is made of Cu in order to carry out a deposition at a reduced cost and to obtain a SESAM having a high thermal conductivity.

BRIEF DESCRIPTION OF THE DRAWINGS

Other advantages and features of the invention will become apparent upon reading the description, illustrated by the following figures:

FIGS. 3A to 3D (already described), diagrams showing the steps of a method for fabricating a component with saturable absorptive material according to the prior art;

FIGS. 4A to 4H, diagrams showing a first example of a method for fabricating mirrors with semiconductor saturable absorber according to the present description;

FIGS. 6A to 6J, diagrams showing a second example of a method for fabricating mirrors with semiconductor saturable absorber according to the present description;

DETAILED DESCRIPTION

Figure 1:
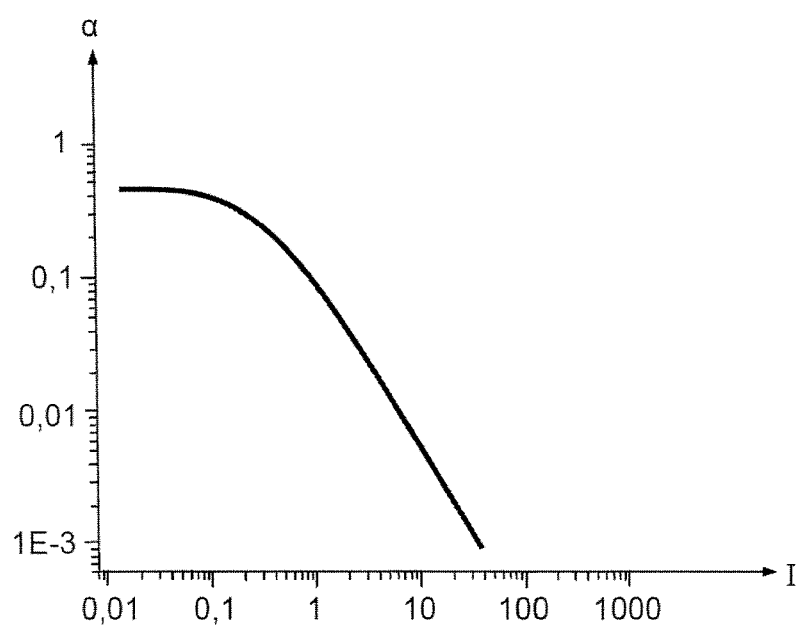
FIG. 1 (already described), a graph showing the variation of the coefficient of absorption α of a saturable absorptive material as a function of the intensity I of an incident light beam passing through it.
Figure 2A:
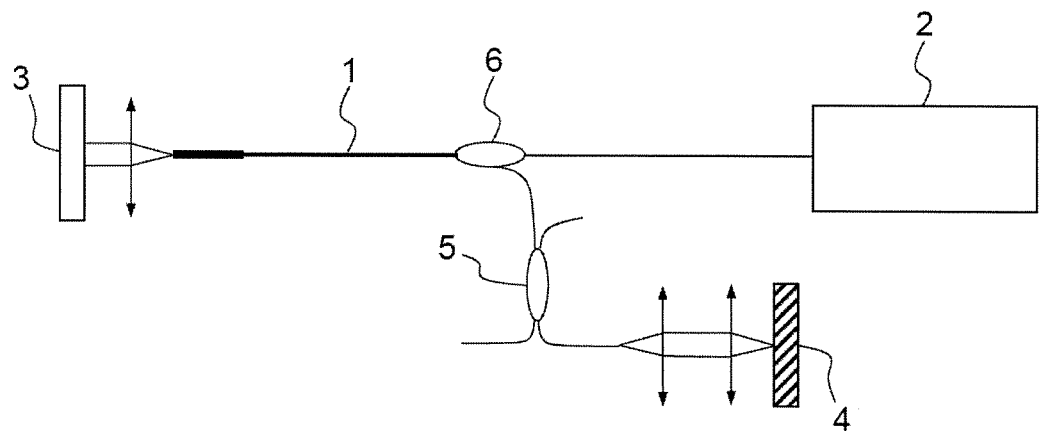
FIGS. 2A and 2B (already described), a diagram of a laser device comprising a cavity and a mirror using saturable absorptive material inserted into the laser cavity.
Figure 2B:
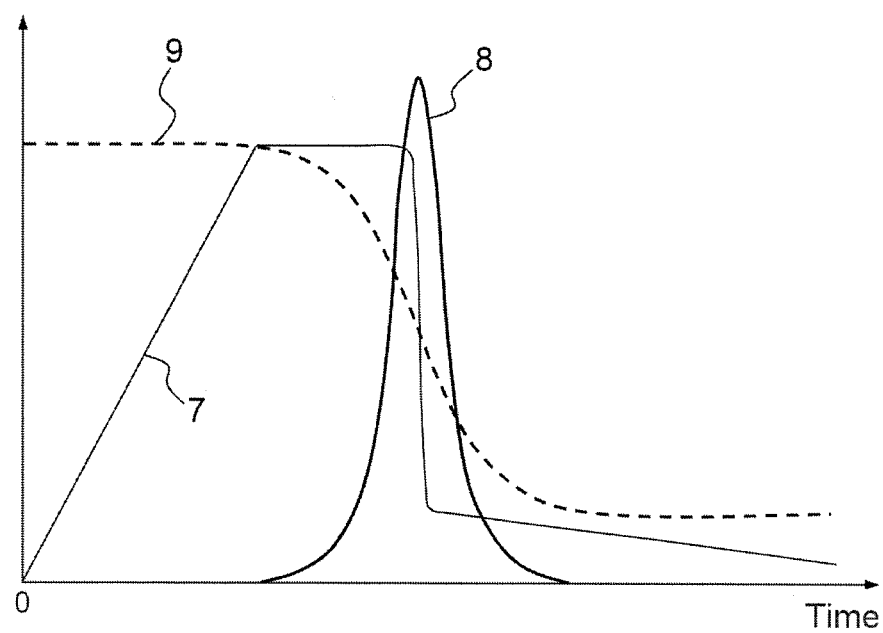

In the figures, identical elements are indicated by the same references.

FIGS. 4A to 4H show the various steps of an example of a method for fabrication of several mirrors with semiconductor saturable absorber obtained starting from a single epitaxial growth wafer according to the present description.

The first step (FIGS. 4A, 4B, 4C) comprises the growth of semiconductor layers 202 on a growth substrate 200, for example an InP (Indium Phosphide) substrate. The semiconductor layers that are grown on the substrate are successively, according to an example, a stopping layer 201, for example an InGaAs (Indium-gallium arsenide) layer, for example of thickness 400 nm, then an alternating stack 205 of quantum wells and of barriers separating the quantum wells, this assembly being designed to have the desired properties of excitonic absorptions at the wavelength of use, for example 1.55 µm.

The growth of the semiconductor layers 202 on the substrate is carried out, for example, by epitaxy MOVPE (for "Metal Organic Vapor Phase Epitaxy") or by molecular jet epitaxy (MJE). In the case of MJE, the growth of the material results from the interaction under ultra-high vacuum of a molecular jet with the surface of the heated substrate. The principle of MOVPE is based on the interaction of a gaseous mixture with the substrate. The MOVPE does not take place under ultra-high vacuum. The gaseous phase is composed of molecules containing the metal elements that it is desired to incorporate onto the substrate, and of a vector gas allowing both the pressure to be held constant in the reactor and the flux of the precursors to be oriented toward the substrate.

A lattice match between the crystal lattices of the layers and of the substrate is advantageously complied with. It is for this reason that the growth of the layers is carried out on an InP substrate and not, for example, on a substrate of silicon (Si). The composition of the stopping layer is adjusted in order to obtain an absorption band situated, for example, around 1.41 µm and the thicknesses of the quantum wells and of the barriers between quantum wells are then adjusted so as to obtain a marked excitonic absorption around 1.55 µm.

Preferably, the saturable absorptive material of the SESAM such as described in the present invention has good absorption saturation properties at the wavelength of use. The absorption saturation properties depend on the energy bands of the material (set of states of the material), in other words for example the difference between the energy of the fundamental state of the material and the energy of the excited state. Preferably, the absorptive material is formed by means of quantum wells (typical thickness of 7 to 12 nm), but thicker layers are also suitable. The composition of the quantum wells and of the barriers which separate the quantum wells is then adjusted in order to obtain an excitonic absorption that is more particularly marked at the wavelength of use.

Depending on the value of the gain of the active medium of the laser, a single or several quantum wells may be used. In the latter case, the number of quantum wells may, for example, be equal to 8, each quantum well having a thickness of 9 nm and each barrier for separation between quantum wells having a thickness of 7 nm. This low absorbing thickness advantageously allows the thermal effects to be reduced and saturation powers compatible with the laser powers to be obtained.

According to an embodiment of the method of the present application, the step for growth of materials on the growth substrate may be followed by a step for ion irradiation (FIG. 4D). Nevertheless, this step may be carried out at any given moment in the fabrication between each growth step. Ions, for example $Ni^{+6}$ ions, are directed onto the second phase layer. They then pass through the structure composed of the successive layers to end up in the growth substrate. During their passage, the ions create crystal defects within the absorptive material. The presence of defects within the absorptive material advantageously allows the process of relaxation of the absorption to be accelerated without degradation of the properties of the latter. The defects indeed play the role of efficient capture centers for electron-hole pairs. The energy of irradiation is adjusted so that the ions pass through the entire structure and finish their travel in the growth substrate. The latter will subsequently be removed in order to avoid any residual absorption caused by the ions.

The decrease in the relaxation time of the absorption, which is the response time of the SESAM, is directly linked to the dose of irradiation, in other words to the number of ions per unit area. This technique advantageously allows the response time of the SESAM to be adjusted after the step for epitaxial growth of the semiconductor layers. Response time less than the picosecond may be obtained without degrading the excitonic absorption. The dose of irradiation of $Ni^{+6}$ ions may, for example, be equal to $2.10^{11}$ ions per $cm^2$, which results in a SESAM whose response time is substantially equal to 6 ps. The energy of the ions may be equal to 11 MeV, this induces a stopping distance substantially equal to 2 µm.

According to an embodiment, it is possible to introduce these crystal defects in the course of the step for growth of the semiconductor layers, notably by effecting the growth at low temperature or by carrying out the growth assisted by plasma.

According to an embodiment, the next step of the method, illustrated in FIG. 4E, comprises a step for deposition of a metal layer 211 on the semiconductor structure 202. This metal layer plays a role of mirror in the SESAM and will, advantageously, play a role of electrode during the next step for the electrolytic deposition. The deposition of the metal layer 211 is carried out for example by evaporation under vacuum (pressure substantially equal to $10^{-7}$ mbar). The material used for fabricating the mirror is a metal chosen for its good optical and thermal qualities, in other words, in order to exhibit a high reflectivity and a high thermal conductivity. A deposition of silver (Ag) or of gold (Au) meets these two conditions well. By way of non-limiting example, a mirror made of gold of 300 nm thickness may be formed on the second phase layer, after de-oxidation of the surface of this second layer by chemical attack using hydrochloric acid (HCL) diluted to 10%. The reflectivity of the mirror 211 is then equal to around 95%.

Advantageously, the mirror 211 may have a reflectivity close to 1. In order to obtain such a reflectance, the mirror may be of the type: metal mirror (as described in the preceding paragraph), or hybrid mirror. The hybrid mirror is the combination of a metal mirror and of a Bragg mirror. The Bragg mirror is composed of several periods of dielectric or semiconductor layers with alternately high and low refractive index. By virtue of a reflectivity that is already high of the metal layer, the addition of a small number of layers, alternately of low index and of high index, allows the hybrid mirror to achieve a better reflectivity than with a metal mirror. However, as the dielectric and semiconductor materials have a thermal conductivity that is much lower than with metals, depending on the configurations and on the field of application it may be expected that the metal mirror alone allows a better thermal evacuation.

According to an embodiment, the method comprises a step for deposition by electro-deposition (potentially through an insulating mask 312) of a metal thermally-conductive 212 on the metal layer 211. This step is illustrated in FIGS. 4F, 4G and 5.

The metal deposition by electro-deposition consists in placing two electrodes, an anode and a cathode in a bath (the electrolyte) which contains metal salts in solution. The passage of an electrical current between these two electrodes makes these metal particles migrate and leads to the deposition of a thin layer of metal on the cathode. The method of electrolytic deposition therefore requires the application of an external electrical potential, which requires an electrical contact with the surface on which the metal is deposited. In the case of the present invention, the surface of the sample advantageously plays the role of the cathode being coated with an electrically-conducting layer (the first mirror 211) before the electro-deposition is carried out.

Advantageously, the electrolytic deposition is performed with copper whose thermal conductivity ($\kappa$Cu~400 W/(m*K)) is high and which allows a deposition at reduced cost. However, the use of other metals may be envisioned, such as for example gold.

Figure 5:
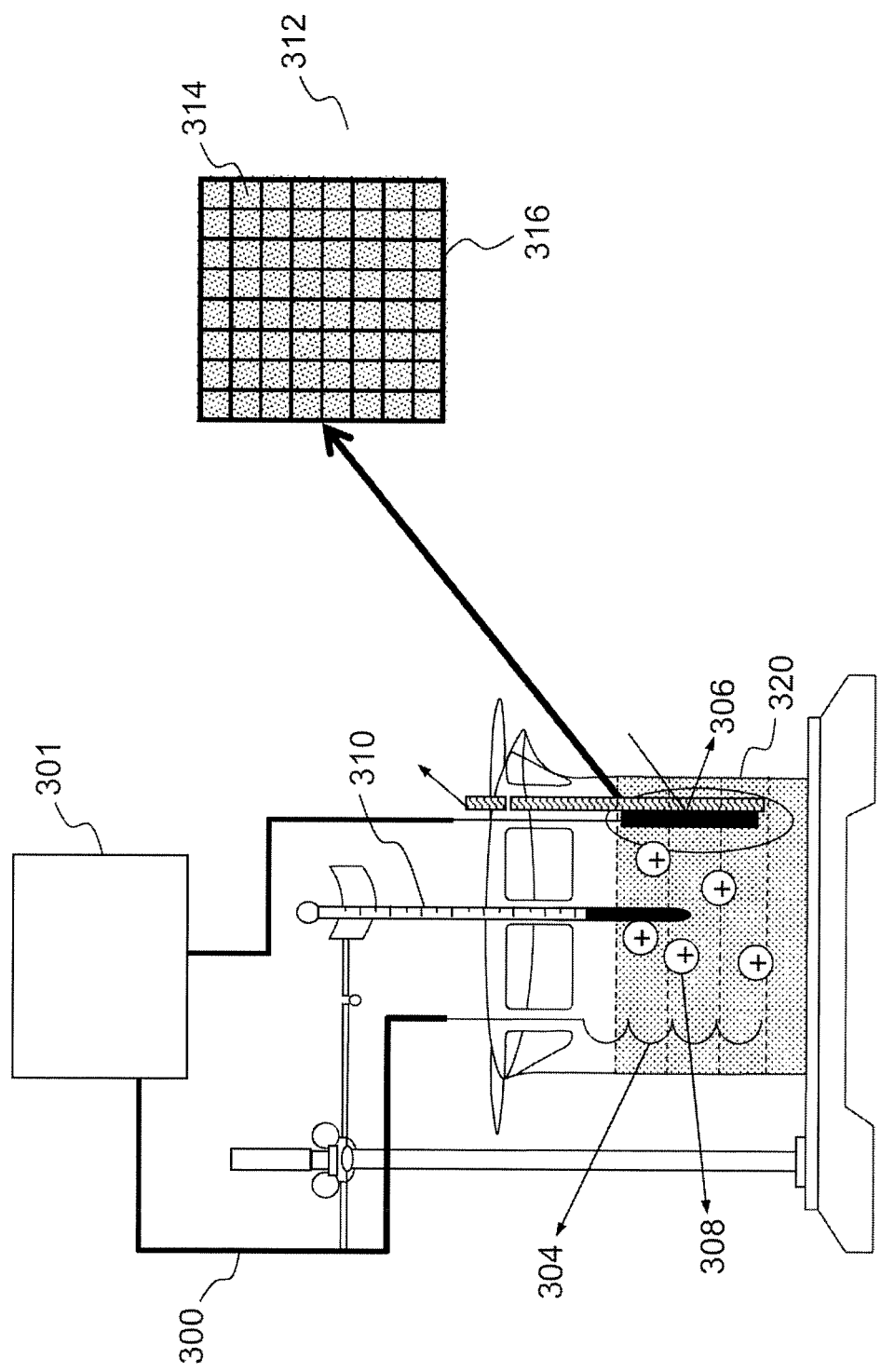
FIG. 5, a diagram showing the principle of electrolytic deposition for the formation of mirrors with semiconductor saturable absorber according to the present description.

An example of configuration of the device for the deposition step by electro-deposition is shown in FIG. 5.

The technology of electro-deposition allows a dense and uniform material to be deposited with low voltages minimizing the edge effects, notably by controlling the constancy of the composition of the solution, ensuring the uniformity of the potential on the surface of the electrode and of the transport of mass.

For this purpose, a tank 320 with two electrodes is used, an anode 300 (positive terminal) and a cathode 302 (negative terminal) connected to a current generator 301. The component to be coated 306 is placed in the electrolyte tank. The component to be coated 306 plays the role of cathode on which metal ions (positive ions) will be deposited. The electrolytic solution 308 that fills the tank and contains the metal ions is chosen according to the desired deposition. When the electric current flows (which may be a continuous or pulsed current), the electrodes attract to them the ions of opposite charges. The motive force of the flow of the fluid directs the particles to the surface of the cathode and prevents it from sedimenting. Commercial solutions containing copper or gold may be used as electrolytes, For example, products from the company ROHM® may be used to optimize the thickness and the uniformity of the metal layers with a deposition rate typically of 100 µm per hour. Furthermore, the temperature of the electrolytic solution is a parameter having an impact on the characteristics of the deposition, and it is therefore monitored throughout the whole deposition by a thermometer 310.

The electrolytic deposition allows the final thickness of the SESAM to be controlled by varying the parameters of time and of generated current. It is thus possible to obtain a rigid or flexible SESAM, depending on the thickness of the deposited metal, typically between ~1 µm to >100 µm.

Thus, for example, a layer of copper of thickness 100 µm may be deposited on a surface area of 7*7 mm$^2$ using an electrolytic solution comprising hydrated copper sulfate (CuSO4.5 H2O–0.075) and sulfuric acid (H2SO4–0.196) with an electrical current density of 60 mA.cm$^2$, at a temperature of 20° and in around 90 min. A layer of gold with a thickness of 80 µm may be deposited using an electrolytic solution, for example a Gold-SF solution coming from the company METAKEM® with an electrical current density of 30 mA.cm-$^2$, a temperature of 45° C. and in around 75 min.

According to a variant of the present description, the electrolytic deposition is effected through an electrically-insulating mask 312 which has previously been disposed on the deposition surface (FIG. 4E). This mask, shown in FIG. 5, may be made of photoresist, formed by optical lithography, a conventional method of microelectronics. This mask has structure-forming patterns comprising insulating structures 316 determining the pattern to be structured and open areas 314. On the insulating structures, the current does not flow and there is no deposition. On the open areas, the current flows and there is deposition of a metal layer. The structure-forming patterns may notably be rectangular patterns disposed in a matrix, for example 20*20 square SESAMs with dimensions of 2*2 mm$^2$. The use of the insulating mask allows a large number of SESAMs to be obtained from an epitaxied wafer.

The regions with no deposition play two roles. On the one hand, it forms preferential tracks for the dicing of the individual SESAMs and, on the other hand, it allows a relaxation of the possible constraints of the electrodeposited metal layer. Indeed, over a large area, these constraints could lead to a curvature of the SESAMs, by 'bi-metal' effect, which would be detrimental to their optical efficiency.

This method thus allows mirrors to be formed with saturable absorptive material with a size adapted to each specific need according to the geometry of the mask.

After the electrolytic deposition, the deposited copper is polished to a thickness for example of 150 µm. This polishing allows, notably, the edge effects to be eliminated and a flat lower surface to be obtained for a good contact with an underlying carrier. This carrier allows the device to be manipulated more easily and the temperature of the device to be controlled via for example a thermoelectric element (Peltier element).

The InP substrate is commonly removed after this polishing step (FIG. 4H). The removal of the substrate may be carried out by a mechanical thinning followed by a selective chemical etching, dry or (preferably) wet. The thinning allows the thickness of the substrate to be reduced, for example by around 90%, and the chemical etching step allows the remainder of the substrate to be removed. The removal of the substrate may also be carried out entirely by selective chemical etching, dry or wet. The selectivity of the etching process should be high (typically greater than 100) in order to protect the remainder of the structure. The stopping layer fulfills perfectly this role. It will subsequently be removed, also by selective chemical etching.

It should be noted that the thickness of the metal deposition may be adapted to specific needs. A thickness of 150 μm, as mentioned as an example hereinabove, allows a good mechanical rigidity and a flatness of the SESAMs to be ensured once the InP substrate has been removed. However, in some cases, it may be desired to form flexible SESAMs, for example in order to bring the SESAM into contact with a non-planar surface, such as the end of an optical fiber connector. In this case, the thickness of the metal deposition may be limited to a typical value of the order of 10 μm. More generally, the thickness may be in the range between 10 and 200 μm.

The individual SESAMs are then separated from one another by cleaving. This separation may for example be carried out after the etching of the InP or after the deposition of the second mirror.

It is thus possible to fabricate in a collective manner, at low cost, a large number of SESAMs with semiconductor saturable absorber with identical characteristics starting from a single epitaxied wafer, typically from 300 to 400 SESAMs for a wafer of 5 cm diameter.

It is thus possible, thanks to the method described in the present description, to produce 10 times more components than with a method of the prior art, such as described for example in the patent application FR2835065.

Indeed, this method is all the faster in that it does not require any step for dicing of the host substrate (113, FIG. 3C) in order to separate the components according to the embodiment of the patent application FR2835065.

FIGS. 6A to 6J illustrate a variant of a method for forming mirrors with semiconductor saturable absorber for the fabrication of a SESAM forming a Fabry-Pérot cavity. The steps 6A, 6B, 6D, 6F, 6G, 6H, 6J are respectively similar to the steps previously described in FIGS. 4A, 4B, 4D, 4E, 4F, 4G.

According to this variant, the method comprises after the step for removing the InP substrate, a step for deposition of a second mirror 207 (FIG. 6J). This mirror may notably be a Bragg mirror composed of dielectric materials. Thus, a mirror with saturable absorptive material is obtained which forms a micro-Fabry-Pérot cavity.

Advantageously, according to this variant, a first phase layer 203, for example a layer of InP material typically of thickness 250 nm, is inserted between the stopping layer 201 and the assembly 205 composed of the quantum wells and the quantum well barriers (FIG. 6C) between the step for growth of the stopping layer 201 (FIG. 6B) and the step for growth of the structure 205 (FIG. 6D).

Then, a second phase layer 206, for example a layer of InP material typically of thickness 75 nm, is added to the assembly composed of the quantum wells and the barriers separating the quantum wells (FIG. 6E) between the step for growth of the structure (FIG. 6D) and the step for growth of the stopping layer (FIG. 6F).

By adjusting the thicknesses of the phase layers, it is possible to suitably position the active layer at the maximum intensity of the intra-cavity wave.

These steps are subsequently followed by the step for separation of the SESAM from one another by cleaving such as previously described.

Figure 7:
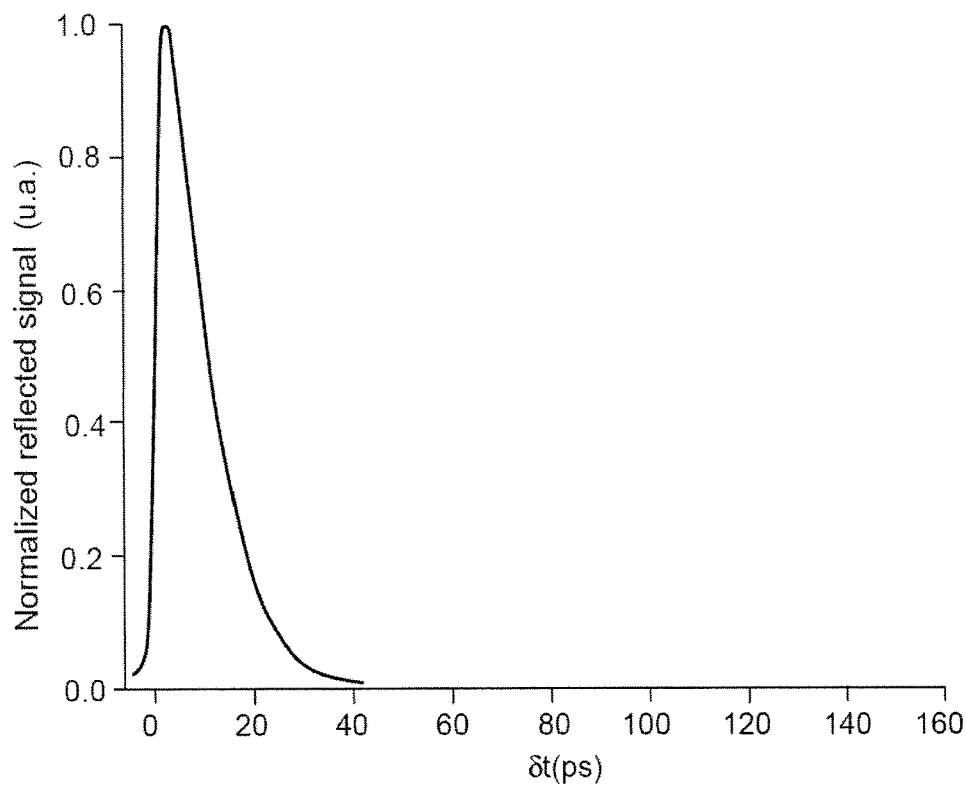
FIG. 7, a graph showing the response time measured on SESAMs fabricated with one example of a method of fabrication according to the present description.
Figure 8:
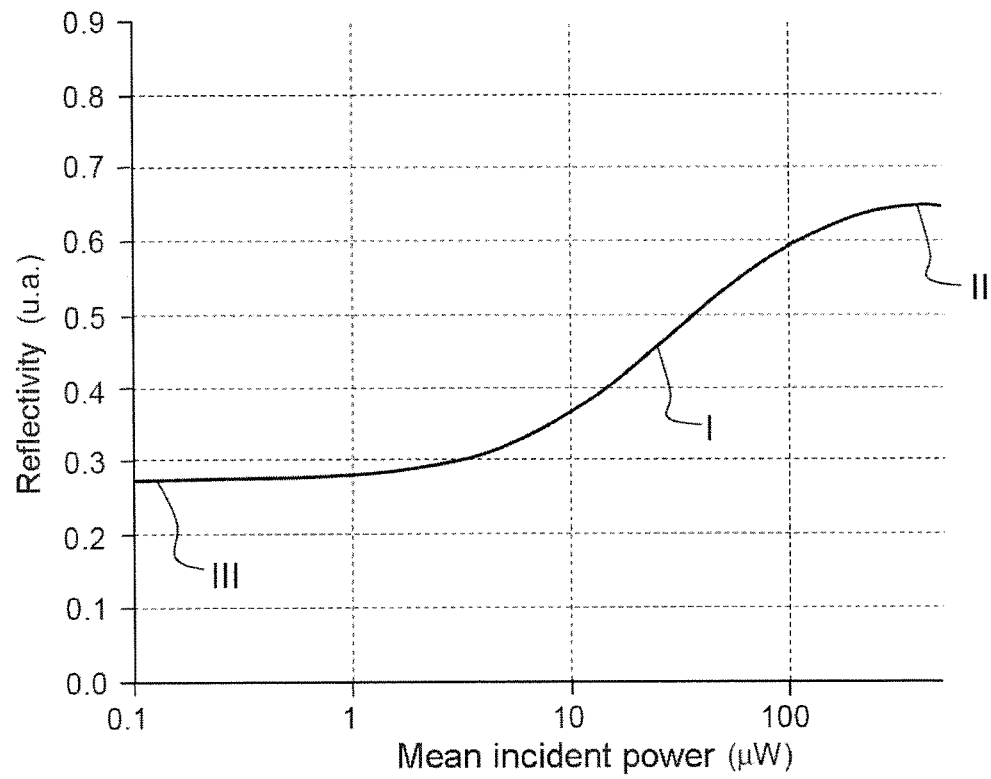
FIG. 8, a graph showing the non-linear characteristics of SESAMs fabricated with one example of a method of fabrication according to the present description.

FIGS. 7 and 8 show characterization curves for a SESAM obtained according to an example of method of fabrication such as described in the present invention. These characterizations allow the performance of the SESAMs fabricated according to the method to be verified. The SESAM has been obtained with a method such as described in the FIGS. 4A to 4I. It comprises the deposition by lattice-matched epitaxy, on a substrate of InP (200, FIG. 4A), of a layer of 350 nm of InGaAs (the exact composition is $In_{0.53}Ga_{0.47}As$, which is lattice matched with the substrate of InP), used as a stopping layer for the selective chemical attack, of a phase layer of 270 nm of InP, then of a saturable absorptive layer of 355 nm of InGaAs, and finally of a phase layer of 187 nm of InP. A layer of 350 nm of Au (first mirror 211) and a layer of 80 μm of Cu are subsequently deposited by electro-deposition. In order to obtain a sufficient speed of the relaxation time of the carriers in the quantum wells, the semiconductor structure has been subjected to an ion implantation with iron ions of 400 keV energy, a dose of 1.5 $10^{14}$ ions per $cm^2$, then to a rapid thermal annealing at 700° C. for 15 seconds, designed to stabilize the characteristics of the saturable absorptive material, and to limit the size of the non-saturable losses. The implantation and the annealing have been carried out prior to the deposition of the layer of gold, in order to avoid the gold diffusing into the semiconductor crystal during the annealing.

FIG. 7 shows the time-domain characterization of this SESAM, in other words the measure of the response time of the SESAM. This response time corresponds to a relaxation time of the SESAM for going from a reflecting state to a state of absorption of the incident light. It is correlated with the lifetime of the free carriers in the material. This measurement may be performed by means of a measurement station with a very high time resolution, of the pump-probe type. This technique consists in sending a first pulse of high intensity (pump pulse) onto the sample. This pulse will be absorbed and, in reaction, create a certain density of free carriers. The latter will then occupy the available states and thus reduce the absorption of the sample. A second pulse of much lower intensity (probe pulse) is sent subsequent to the pump pulse, with a known delay δt. Since the number of available states has been reduced by the preceding pump pulse, the absorption of the probe pulse will be modified and will thus depend on the delay between the two pulses. For a very short delay, the absorption of the probe will be weak, whereas for sufficiently long delays compared with the relaxation time of the carriers, the absorption of the probe will be a maximum. By measuring the reflected signal which is directly connected to the absorption of the material as a function of the delay δt of the probe pulse with respect to the pump pulse, it is thus possible to measure the variation over time of the density of carriers and hence to recover the response time of the sample.

In FIG. 7, it can be observed that the normalized reflected signal is zero when the delay δt is negative, in other words before pump pulse saturates the absorption of the saturable absorptive material. When the delay becomes zero, in other words when the pump pulses overlap in the time domain with the probe pulses, the normalized reflected signal then becomes a maximum since the density of carriers, and consequently the variation of absorption, is then a maximum. Then, as expected, the normalized reflectivity signal decreases exponentially to 0 when δt becomes positive. Using these measurements, it may be deduced from these that the response time of the SESAM is equal to 7 ps. It should be noted that complementary measurements have shown that this response time can be adjusted (for typical values of 0.5 to 15 ps by varying (from 450° C. to 750° C.) the temperature of the rapid thermal annealing that follows the ion implantation step.

FIG. 8 shows the characterization of the non-linear properties of the SESAM previously described. The characterization is obtained by measuring the reflectivity (ratio between the reflected power and the incident power) as a function of the mean power of the pulses incident on the SESAM. Using these measurements, it is possible to deduce from these the switching power I which corresponds to the incident power needed to whiten the SESAM. It is also possible to determine the contrast defined by C-10 log (Rmax/Rmin), with Rmin the minimum reflectivity at low incident power (indicated by the reference III in FIG. 8) and Rmax the maximum reflectivity at high incident power (indicated by the reference II in FIG. 8). In FIG. 8, the significant non-linear variation of the reflectivity R as a function of the mean incident power can clearly be observed, together with the convergence of the reflectivity toward a maximum value at the very high incident powers, which is proof of a saturation of the absorption. For this SESAM, from the curve illustrated in FIG. 8, a contrast of 3.8 dB is obtained with a minimum reflectivity of 27% and a maximum reflectivity of 65%, together with a switching power of 25 µW.

Although described via a certain number of detailed exemplary embodiments, the mirror with semiconductor saturable absorber and its method of fabrication comprising various variants, modifications and improvements which will be clearly apparent to those skilled in the art, it being understood that these various variants, modifications and improvements fall within the scope of the invention, such as defined by the claims that follow.

The invention claimed is:

1. A method for manufacturing mirrors with semiconductor saturable absorber comprising:
   the deposition onto a substrate for growth of a semiconductor saturable absorptive material so as to form a structure;
   the deposition of at least one metal layer onto the structure in order to form a first mirror;
   the deposition by electro-deposition through an electrically-insulating mask of a thermally-conductive substrate onto the metal layer, allowing the selective deposition of the thermally-conductive substrate, in order for the mask to predefine the perimeter of the mirrors with semiconductor saturable absorber.

2. The method as claimed in claim 1, comprising a step for introduction of crystal defects into the semiconductor saturable absorptive material in order to limit the lifetime of the carriers in the semiconductor saturable absorptive material to 100 ps.

3. The method as claimed in claim 2, wherein the step for introduction of crystal defects comprises a step for ion irradiation in the saturable absorptive material.

4. The method as claimed in claim 1, wherein the first mirror is used as a cathode for the electro-deposition.

5. The method as claimed in claim 1, wherein the electrically-insulating mask has structure-forming patterns comprising insulating regions and open areas, in order to predefine the perimeter of the mirrors with semiconductor saturable absorber.

6. The method as claimed in claim 1, further comprising a step for deposition of a second mirror onto the saturable absorptive material.

7. The method as claimed in claim 6, further comprising a step for deposition of a first phase layer between the first mirror and the saturable absorptive material and a step for deposition of a second phase layer between the second mirror and the saturable absorptive material.

8. The method as claimed in claim 1, further comprising a step for separation of the mirrors with semiconductor saturable absorber predefined by the mask.

* * * * *